(12) United States Patent
Suzuki

(10) Patent No.: US 6,385,636 B1
(45) Date of Patent: May 7, 2002

(54) DISTRIBUTED PROCESSING SYSTEM AND CLIENT NODE, SERVER NODE AND DISTRIBUTED PROCESSING METHOD

(75) Inventor: Yasuhiro Suzuki, Machida (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/124,435

(22) Filed: Jul. 29, 1998

(30) Foreign Application Priority Data

Jul. 30, 1997 (JP) ............................................. 9-204144

(51) Int. Cl.$^7$ ................................................ G06F 9/00
(52) U.S. Cl. ........................ 709/105; 709/223; 709/251; 709/100
(58) Field of Search ................................ 709/201, 221, 709/222, 100, 102, 104, 105, 106, 300, 101, 103, 108, 223, 251, 217, 218

(56) References Cited

U.S. PATENT DOCUMENTS

| | | | | |
|---|---|---|---|---|
| 4,403,286 A | * | 9/1983 | Fry et al. ..................... | 364/200 |
| 5,031,089 A | * | 7/1991 | Liu et al. ..................... | 364/200 |
| 5,155,858 A | * | 10/1992 | DeBruler et al. ........... | 709/300 |
| 5,265,250 A | * | 11/1993 | Andrade et al. ............ | 395/650 |
| 5,740,371 A | * | 4/1998 | Wallis ................... | 395/200.59 |
| 5,778,224 A | * | 7/1998 | Tobe et al. ................. | 709/100 |
| 5,944,779 A | * | 8/1999 | Blum ......................... | 709/201 |
| 5,958,009 A | * | 9/1999 | Friedrich et al. ........... | 709/224 |
| 5,978,844 A | * | 11/1999 | Tsuchiya et al. ............ | 709/221 |
| 6,026,425 A | * | 2/2000 | Suguri et al. ............... | 709/105 |
| 6,047,323 A | * | 4/2000 | Krause ...................... | 709/227 |

* cited by examiner

Primary Examiner—Majid Banankhah
(74) Attorney, Agent, or Firm—Kevin M. Jordan; Anne Vachon Dougherty

(57) ABSTRACT

To suitably distribute the load between a client node and a server node in a client-server system, the client node sends a task request signal to the server node in response to input from a user. The server node, upon receiving the task request signal, acquires a CPU load ratio from the operating system and performs the requested task when the CPU load ratio is lower than a preset value to send the result of the task to the client node. Conversely, when the CPU load ratio is higher than the preset value, the server node sends a response signal to the effect that the client node is to execute the requested task. When the client node requests transmission of an application program in response to the response signal from the server, the server node sends an application program for use in performing the requested task to the client node. The client node executes the application program and obtains the result of the task.

20 Claims, 9 Drawing Sheets

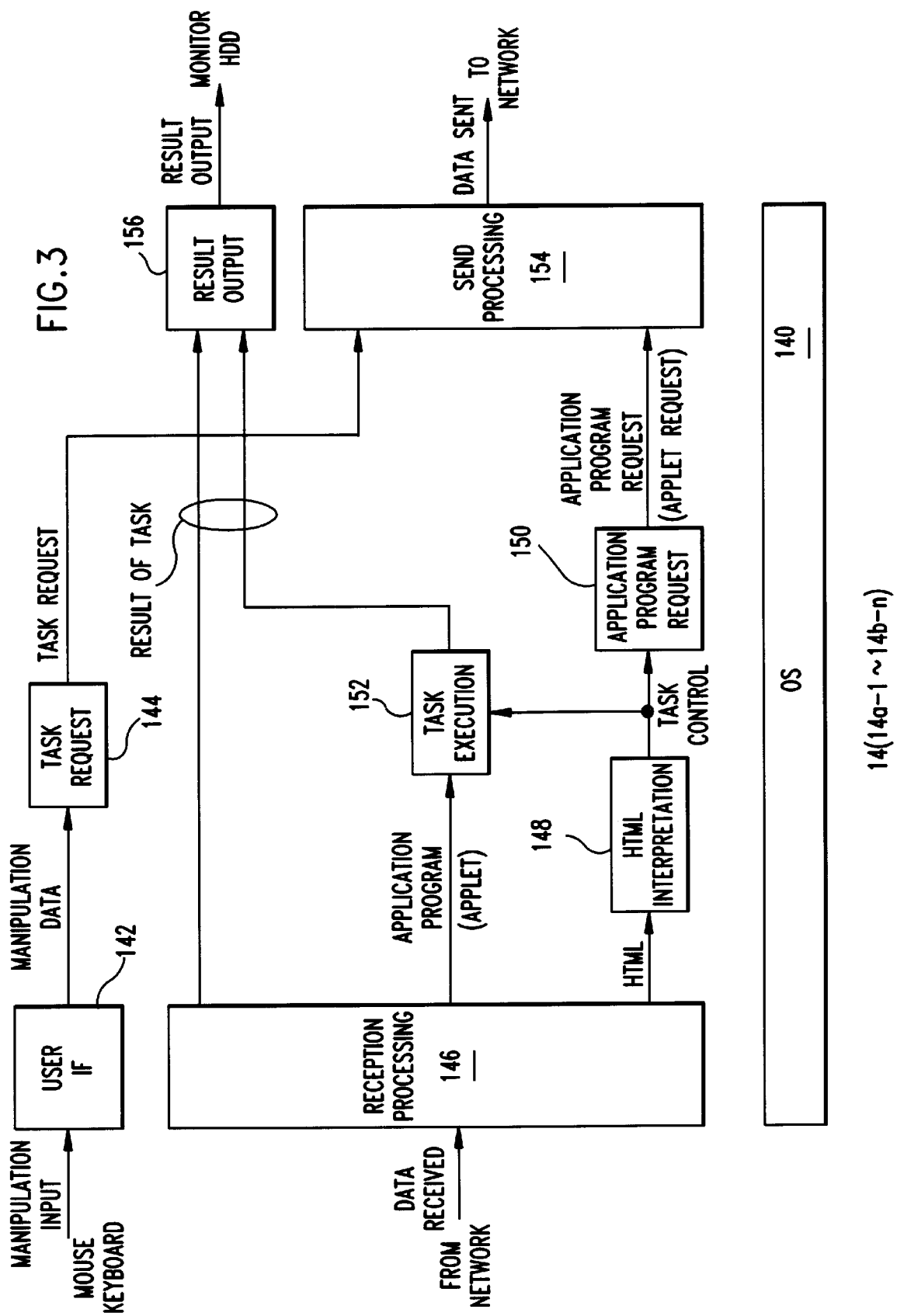

DISTRIBUTED PROCESSING SYSTEM AND CLIENT NODE, SERVER NODE AND DISTRIBUTED PROCESSING METHOD

FIELD OF THE INVENTION

This invention relates to a distributed processing system in which one or more client machines (client nodes) and a server machine (server node) are connected through a network, a client node and a server node constituting such distributed processing system, and a distributed processing method in such distributed processing system.

BACKGROUND OF THE INVENTION

There has been a use of a client server system for distributed processing wherein a server node and a client node (which are collectively called simply a node) are connected through a network, for example the Internet. In the past, in order for a server node to request a client node to do processing (i.e., a task) and obtain the result of the task in such a client server system, one of two methods was employed. In a first method, all tasks were executed in the server node side and the result of the task was returned to the client node. In an alternative, second method, a task program (application program) was sent from the server node to the client node through a network and the client node side executed the application program to obtain the result of the task.

In the first method, however, all tasks had to be processed in the server node so that the processing load in the server node became excessively heavy resulting in a prolonged response time before the result of the task was returned to the client node. In the second method, on the other hand, the processing capability of the client node in hardware and software aspects was generally lower than the processing capability of the server node, also resulting in a prolonged response time until the result of the task was obtained.

To avoid such disadvantages, it is desirable to distribute the processing load between the nodes. As to distribution of processing load in such client server system, PUPA 4-80858 (reference 1), PUPA 5-128029 (reference 2) and PUPA 9-91231 (reference 3) are known, for example. However, the load distributing method disclosed in reference 1 simply transfers an application program from the server node to the client node for execution after preserving a required work area in the memory, so that the method is subject to the same disadvantage as the above second method. The load distributing method disclosed in reference 2 selects a client node which is most suitable for execution of the application program among a plurality of client nodes and sends the application program to the selected client node for execution. The reference 2 method has the same disadvantage as the load distribution method disclosed in the reference 1. Finally, in the load distributing method disclosed in the reference 3, because nodes which are capable of executing each of application programs have to be registered in advance, an extensive system modification as well as a large investment are required when applied to an existing client server system.

In view of the above described problems in the prior art, it is therefore an object of this invention to provide a distributed processing system and method which minimizes response time from the time when a client issues a task request to the time when the result of the task is obtained, by suitably distributing the load between a client node and a server node in a client server system in which the client node and the server node communicate with each other through a network.

It is another object of this invention to provide a distributed processing system (and method for using same) which is adapted to an existing client server system without requiring an extensive modification of the system and a large amount of investment, and which realizes a large reduction of response time.

SUMMARY OF THE INVENTION

For the purpose of achieving the above objectives, this invention provides a distributed processing system consisting of one or more client node(s) and server node(s) communicating with each other. In accordance with the invention, each of said client nodes comprises: task request means for requesting said server node to process a predetermined task; task program executing means for receiving a program for said requested predetermined task from said server node to execute in accordance with the content of a response signal returned from said server node in response to said request of predetermined task; and, task result acquiring means for receiving the result of execution of said program received from said server node or the result of said predetermined task by said server node to acquire the result of said predetermined task. The inventive server nodes each comprise: processing load measuring means for measuring the processing load of the server node; response means, responsive to the measured processing load of the server node for returning to each of said client nodes which requested said predetermined task at least said response signal which causes said predetermined task to be executed; program sending means for sending the program for said predetermined task to each of said client nodes when each of said client nodes requesting said predetermined task is caused to execute said predetermined task; and task executing means for executing said predetermined task and sending the result of execution to each of said client nodes when each of said client nodes requesting said predetermined task is not caused to execute said predetermined task.

Preferably, when the measured processing load of the server node is more than a preset value, the response means returns said response signal for executing said predetermined task to each of said client nodes, while said program sending means sends said program for the predetermined task to each of said client nodes.

Preferably, when the measured processing load of the server node is less than a preset value, said process executing means executes said predetermined task requested and sends the result of execution to each of said client nodes.

In the distributed processing system of this invention, the client nodes are connected to the server node through a network like the Internet and each communicates with the server node to request the server to process.

The server node receiving a request to process acquires a load ratio (processing load) of a CPU etc. of the server node from the operation system (OS) and, when the load ratio of the CPU etc. is lower than a preset value, executes the requested task and returns the result of the task to the client nodes which requested the task. On the other hand, when the load ratio of the CPU etc. is higher than the preset value, the server node sends the program (application program) which implements the requested task to each of client nodes for execution, thereby distributing the load between the client nodes and the server nodes.

In each client node, the task requesting means, responsive to a user manipulation for example, sends a task request signal requesting a search of a database (DB), task transaction or a file input/output (I/O) processing, etc., to the server node through the network.

The task program executing means is, for example, a Java virtual machine (Java VM) which executes an application program described in Java language in the WWW browser of the client node. When the response signal returned from the server node to the client node in response to said task request signal has a content to the effect that the client node is to perform database search etc., the task program executing means, upon transfer from the server node of the application program in Java language which implements said database search, executes the transferred application program thereby reducing the processing load of the server node.

The task result acquiring means, when performing said database search in the client node side, acquires the result of the task the application program by the task program executing means as a final result of the task while, when the server node side performed said database search, the task result acquiring means acquires the result of said database search done by the server node which is sent over the network as the final result of the task. The acquired result of the task is, for example, displayed in a monitor device or recorded in a recording medium.

In each server node, the processing load measuring means is, for example, a service call of the operation system (OS) and measures the load ratio of a CPU and the like as the processing load of the server node. When the load ratio measured by the processing load measuring means is larger than a preset value, the response means determines that the processing load of the server node is heavy and sends a response signal to the client node which requested said database search over the network to the effect that it will have the client node perform said database search.

The program sending means, when having the client node perform said database search, sends over the network an application program which implements the database search task to the client node which requested to process the database search.

The task executing means, when it does not have the client node which requested the database search executing the database search, (i.e., when the server node performs the database search), executes the requested database search and sends the result of execution to the requesting client node thereby contemplating to effectively use the server node which has a higher performance than the client node.

The client node of this invention comprises, in a distributed processing system including one or more client and server nodes communicating each other, task request means for requesting said server node to process a predetermined task, task program executing means for receiving a program for said requested predetermined task from said server node to execute it in accordance with the content of a response signal returned from said server node in response to said request of predetermined task, and task result acquiring means for receiving the result of execution of said program received from said server node or the result of said predetermined task by said server node to acquire the result of said predetermined task.

The server node of this invention comprises, in a distributed processing system including one or more client and server nodes communicating each other, processing load measuring means for measuring the processing load of the server node, response means responsive to the measured processing load of the server node for returning at least said response signal which causes said predetermined task to be executed to each of said client nodes which requested said predetermined task, program transfer means for transferring the program for said predetermined task to each of said client nodes when causing each of said client nodes requesting said predetermined task to execute said predetermined task, and process executing means for executing said predetermined task and sending the result of execution to each of said client nodes when not causing each of said client nodes requesting said predetermined task to execute said predetermined task.

The distributed processing method of this invention comprises, in a distributed processing system consisting of one or more client node(s) and server node(s) communicating each other, steps performed by each of said client nodes of; requesting said server node to process a predetermined task, receiving a program for said requested predetermined task from said server node for execution in accordance with the content of a response signal returned from said server node in response to said request of predetermined task, and receiving the result of execution of said program received from said server node or the result of said predetermined task by said server node to acquire the result of said predetermined task, and steps performed by said server nodes of; measuring the processing load of the server node, returning at least said response signal which causes said predetermined task to be executed to each of said client nodes which requested said predetermined task in response to the measured processing load of the server node, sending a program for said predetermined task to each of said client nodes when causing each of said client nodes requesting said predetermined task to execute said predetermined task, and executing said predetermined task and sending the result of execution to each of said client nodes when not causing each of said client nodes requesting said predetermined task to execute said predetermined task.

BRIEF DESCRIPTION OF THE DRAWINGS

The invention will now be described in greater detail with reference to the appended figures wherein:

FIG. 3 is a diagram showing an example of the software configuration of the client node shown in FIG. 1;

DETAILED DESCRIPTION OF THE PREFERRED EMBODIMENT

Figure 1:
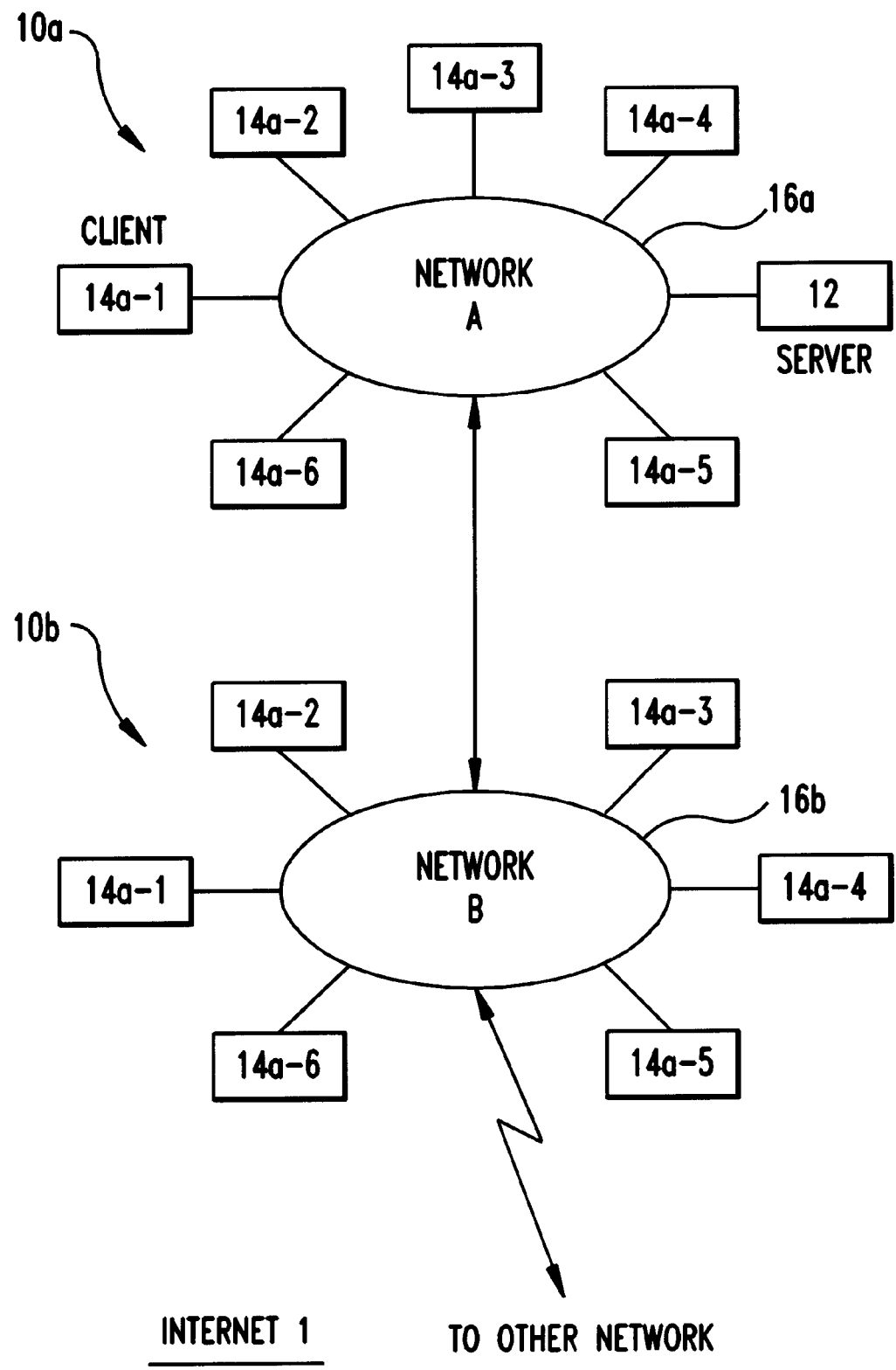
FIG. 1 is a diagram showing an example of the configuration of the internet to which the distributed processing method of this invention is adapted.

FIG. 1 is a diagram showing a configuration of Internet 1 to which the distributed processing method of this invention is applied. As shown in FIG. 1, the Internet 1 comprises k network systems $10a, \ldots, 10k$ ($10a, 10b$; FIG. 1 shows an example where k=2). In the network system $10a$, one or more server nodes (FIG. 1 shows an example where the number of the server node 12 is 1) and m client nodes $14a-1, \ldots, 14a$-m ($14a-1, \ldots 14a$-6; FIG. 1 shows an example where m=6) are connected to other nodes in the same or another network (when called collectively, the server node and the client node are simply called a node) through a network $16a$ (network A) capable of data transmission including an ISDN network, a data communication network, a LAN, or a telephone network in a manner in which they are capable of communicating with each other.

In the network system $10b$, n client nodes $14b-1, \ldots, 14b$-n ($14b-1, \ldots 14b$-6; FIG. 1 shows an example where m=6) are connected to other nodes in the same or another network through a network $16b$ (network B) similar to the network $16a$ in a manner in which they are capable of communicating with each other. It should be understood that the network $10b$ may include the server node 12.

Server Node 12

Figure 2:
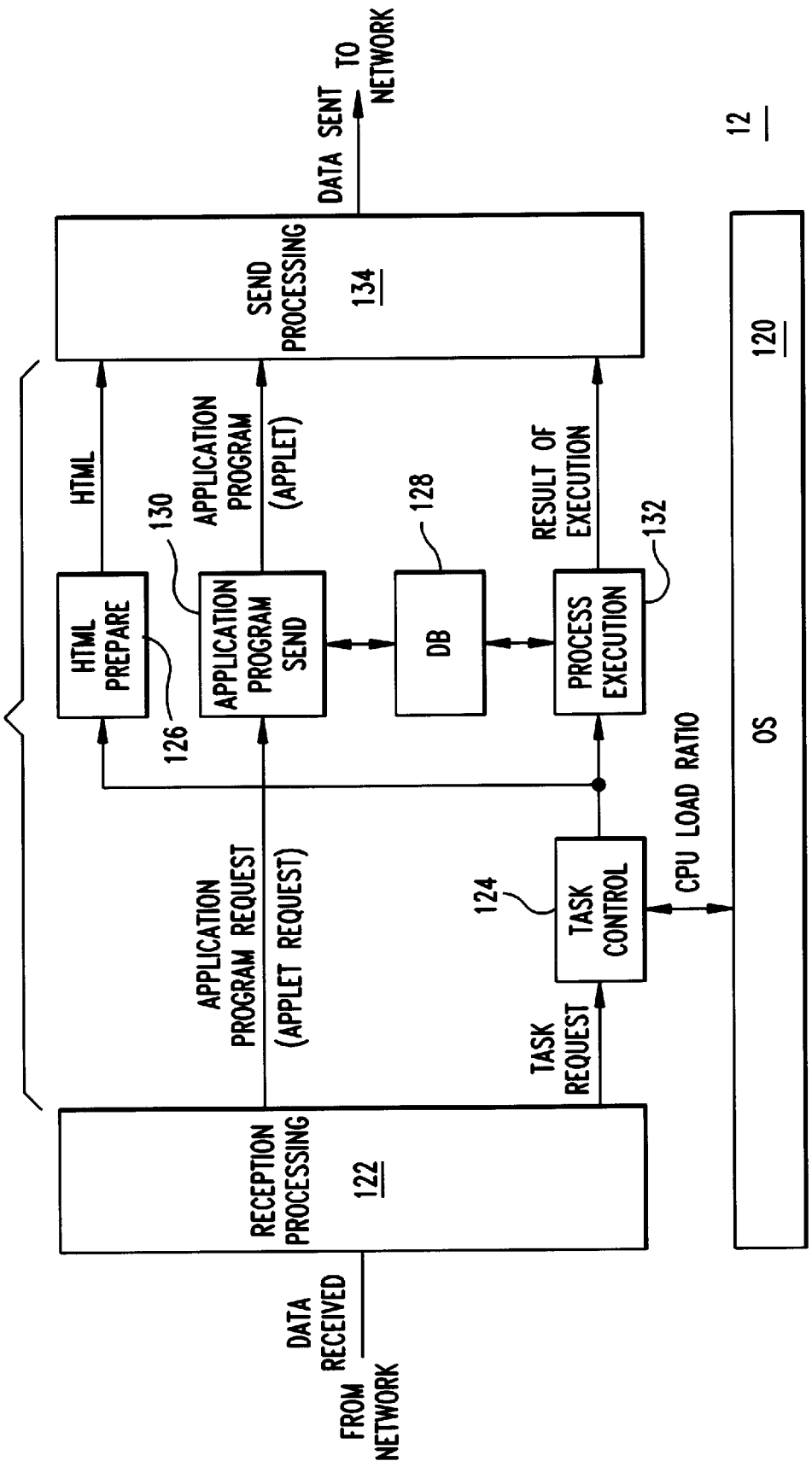
FIG. 2 is a diagram showing an example of the software configuration of the server node shown in FIG. 1.

FIG. 2 is a diagram showing an example of a software configuration of the server node 12 shown in FIG. 1. The configuration and components of the server node 12 will now be described. The server node 12 is a computer which has resources, such as a CPU of a higher processing capability and a memory (not shown) of a larger capacity than the client node 14 (when any of the client nodes $14a$-, . . . , $14b$-n is not specified, they are simply referred to as client node 14), and is capable of executing a program described in Java language. The server node software comprises an operating system (OS) 120, a reception processing part 122, and a program called CGI (common gateway interface or "sevlet" as described in Java language) including a task control part 124, an HTML preparing part 126, a database (DB) 128, an application program send processing part 130, a task execution part 132, and a send processing part 134.

The components of the server node 12 will now be described. In the server node 12, the operation system 120 controls the operation of each software shown in FIG. 2 while it measures the load ratio OR of each resource as a processing load of the server node 12 and outputs the value of the measured load ratio OR to the task control part 124 in response to a service call. The load ratio of each resource includes overall load ratio OR-1 of the CPU of the server node 12, a CPU load OR-2 ratio by each processing task (the total amount of CPU count used for a task versus the total CPU count in certain time period) and a memory load ratio OR-3 (the proportion of the memory quantity occupied for a certain task at a certain point of time). OR-1 is defined by the following expression 1:

$$OR\text{-}1=1-(It1-It2)/(Ct1-Ct2)$$

where, I is an idle count, C is a total count, and t1, t2 are certain points of time.

The reception processing part 122 receives data from each client node 14 through networks $16a$, $16b$ and analyzes the received data for outputting (a) to the application program sending part 130 when the received data from the client node 14 is a task program request signal or (b) to the task control part 124 when the received data is a task request signal. All or a part of the function of the reception processing part 122 may be included in the operating system 120. The data received by the server node 12 contains an identifier of the sending client node 14. Each software component of the server node 12 can identify the client node using the identifier contained in the received data if needed.

When a task request signal is inputted from the client node requesting, for example, to process a database search, the task control part 124 issues a service call to the operating system 120 and acquires the load ratio OR of the CPU and the like of the server node (OR-1, OR-2, OR-3 provided that only OR-1 is used in this mode of embodiment). Hereinafter, the processing task of conducting a database search will be referred to, although the task is not limited to database searching and may be another task including a transaction task.

When the value of the overall load ratio OR-1 of the CPU of the server node 12 meets or exceeds a preset value TH (TH=0~100%), the server node must send a response signal (HTML). The task control part 124 controls the HTML preparing part 126 to cause it to send a response signal to the requesting client node 14 to the effect that the database search should be processed at the client node 14 side, thereby reducing the processing load of the server node 12.

In addition, the task control part 124 controls the HTML preparing part 126 to cause it to send a response signal to the requesting client node through the send processing part 134 to the effect that the client node should execute the process. The task control part 124 controls the application program send part 130 to have it send an application program implementing the database search task (a program described, for example, in Java language and called Applet which is operable on Java compatible WWW browser) to the requesting client node.

When the overall load ratio OR-1 of the server node 12 is lower than a preset value, the task control part 124 controls the task executing part 132 to have it execute the requested database search task and sends the result of the task to the client node which requested the database search task.

The HTML preparing part 126 prepares a response signal which describes the content in, for example, HTML to the effect that the database search should be executed at the client node 14 side according to the control by the task control part 124 and sends it to the send processing part 134. Incidentally, the HTML preparing part 126 designates the Applet to be sent as an Applet tag of the response signal (HTML) when it sends the Applet as an application program. Specifically, if the task control part 124 determines that the processing load of server node 12 is heavy when an Applet tag<applet code=testapplet></applet> is defined in the file of the response signal (HTML; test.html), the task control part 124 sends the response signal (HTML; test.html) to the requesting client node. The client node interprets the received response signal (HTML; test.html) and downloads an application program named testapplet (Applet) from the server node 12 for execution. Such operation to download from the server node 12 and execute the application program (Applet) is implemented by utilizing HTTP (hyper text transfer protocol) between an existing Web server and the Web client. If needed, the client node 14 may display a message, for example, "processing by Applet has been started") to the user when it receives a response signal (HTML).

The database 128 stores and controls programs executed in the send processing part 134 of the task control part 132 or client node 14 and other data to supply the program or other data in response to a request from the application program send part 130 and the task execution part 132.

When a task program request signal (Applet request signal) is inputted from the client node 14, the application program send part 130 is supplied with an application program from the database 128. The supplied application program (Applet) implements the database search task requested by the client node 14 and outputs the supplied application program to the send processing part 134.

The task execution part 132 performs the database search task according to the control by the task control part 124 and outputs the result of the task to the send processing part 134. The send processing part 134 sends response data in HTML form inputted from the HTML preparing part 126, an application program for the database search task inputted from the application program send part 130, and/or the result of the database search task inputted from the task execution part 132 to the requesting client node 14 over the networks 16a, 16b. It is to be noted that, like the reception processing part 122, all or a part of the function of the send processing part 134 may be included in the operating system.

Client Node 14

The configuration and components of the client node 14 will now be described with reference to the FIG. 3 diagram showing a software configuration of the client node 14 shown in FIG. 1. The client node 14 is a multimedia compatible personal computer which is capable of executing a program described in Java language and comprises, as a software, an operating system (OS) 140, a user interface (user IF) part 142, a task request part 144, a reception processing part 146, an HTML interpretation part 148, an application program requesting part 150, a task execution part 152, a send processing part 154 and a result output part 156.

In the client node 14, the operating system 140 controls the operation of the software shown in FIG. 3 in a similar manner to operating system 120 in the server node 12. The user interface part 142 receives user manipulation of an input device, such as a keyboard and a mouse (not shown), generates manipulation data indicating the requested task (for example, the aforementioned database search task) to the server node 12, and outputs to the task request part 144.

The task request 144 generates a task request signal, requesting the database search which the user indicated, to the server node 12 and outputs the signal to the send processing part 154. The reception processing part 146 corresponds to the reception processing part 122 in the server node 12 and receives and analyzes data received from the server node 12 over the networks 16a, 16b. When the data received from the server node 12 is the result of a database search task, the reception processing part 146 outputs it to the result output part 156. On the other hand, when the received data is an application program, it is outputted to the task execution part 152. When the received data is the response data described by HTML, it is outputted to the HTML interpretation part 148. When the received data is a task program request signal, it is outputted to the application program send part 130. Finally, when the received data is a task request signal, it is outputted to the task control part 124. It is to be noted that the function of the reception processing part 146 may be included in the operating system 140 in the manner similar to the reception processing part 122.

The HTML interpretation part 148 receives and analyzes a response signal from the server node 12. When the content of the response data is to the effect that the client node 14 must execute the database search task, the HTML controls the application program requesting part 150 to have it send the application program requesting signal to the server node 12. In addition, the HTML interpretation part 148 controls the task execution part 152 to have it execute the application program received from the server node 12.

The application program requesting part 150 generates an application program requesting signal, which requests that the server node 12 send an application program according to the control by the HTML interpretation part 148, and then outputs the signal to the send processing part 154.

The task execution part 152 stores and executes an application program for a database search task inputted from the reception processing part 146 and outputs the result of the database search task to the result output part 156.

The send processing part 154 corresponds to the send processing part 134 in the server node 12 and outputs a task request signal inputted from the task request part 144 and an application program requesting signal inputted from the application program requesting part 150 to the server node 12 over the networks 16a, 16b.

The result output part 156 displays, as a final result of the task, either the result of the database search task obtained by executing the application program received by the task execution part from the server node 12 or the result of the database search task performed by the server node 12 and inputted from the reception processing part 146 in the display device (not shown) connected to the client node 14, or output them to a recording device (not shown) such as a hard disk device (HDD). Incidentally, the function of the result output part 156 may be included in the operating system 140 in a manner similar to the reception processing part 146.

Operation of Internet 1

The operation of Internet 1 will now be described with reference to the FIG. 4(A) sequence diagram showing signals transmitted between the server node 12 and the client node 14 when the client node 14 side processes, the FIG. 4(B) sequence diagram showing signals transmitted between the server node 12 and the client node 14 when the server node 12 side processes, and the FIG. 5 flow chart showing the content of task in the client node 14 of FIG. 1.

The operation of the internet 1 will now be described with reference to FIG. 4(A) and FIG. 5, taking as an example where the client node 14b-1 requests the server node 12 to process a database search and the client node 14b-1 side processes the database search. While a case where the client node 14b-1 requests the server node 12 to process a database search is shown as an example for the simplicity of explanation, the operation of Internet 1 is the same even when either one of client nodes 14a-1, . . . , 14b-n requests the server node 12 to process the database search or other task.

When the user of the client node 14b-1 indicates a database search by manipulating the input device (not shown), the user interface part 142 receives user input/manipulation and generates input/manipulation data requesting a database search task for output to the task request part 144. As shown by S200 in FIG. 4 (A), the task request part 144 generates a task request signal requesting the server node 12 to process the database search according to the manipulation data inputted from the user interface part 142 and sends the task request signal to the server node 12 through the send processing part 154 and networks 16b, 16a.

In the server node, the reception processing part 122 receives a task request signal from the client node 14b-1 for output to the task control part 124. As shown as a task in step S100 in FIG. 5, the task control part 124 issues a service call to the operating system in response to the input task request signal and acquires the CPU load ratio OR-1.

In step 102 (S102), the task control part 124 proceeds to a task in S104 when the acquired CPU load ratio OR-1 is lower than the preset value TH. In step 104 (S104), the task control part 124 controls the HTML preparing part 126 to have it send a response signal (HTML data) to have the client node 14b-1 side process the database search through the send processing part 134 and the networks 16a, 16b as shown as S202 in FIG. 4(A).

Figure 4A:
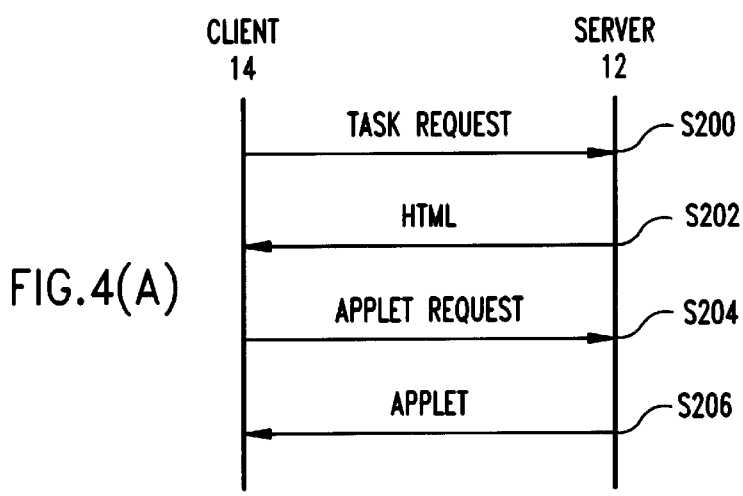
FIG. 4(A) is a sequence diagram showing a signal which is transmitted between the server node and the client node 14 when the client node side processes.
Figure 4B:
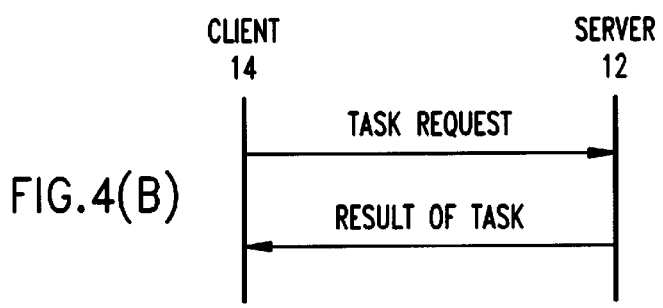
FIG. 4(B) is a sequence diagram showing a signal which is transmitted between the server node and the client node 14 when the server node processes.

In the client node 14b-1, the HTML interpretation part 148, in receiving a response signal from the server node 12, controls the application program requesting part 150 depending on the content of the response signal and has it send an application program requesting signal requesting an application program (Applet) for the database search task to the server node 12 through the send processing part 154 and the networks 16b, 16a as shown as S204 in FIG. 4(A).

In the server node 12, the reception processing part 122, in receiving an application program requesting signal from the client node 14b-1, outputs the received application program requesting signal to the application program reception part 130. The application program reception part 130 is supplied with a program from database 128 for the database search task requested by the application program requesting signal and sends the supplied application program to the client node 14b-1 through the send processing part 134 and the networks 16a, 16b as shown as S206 in FIG. 4(A).

In the client node 14b-1, the reception processing part 146, upon receipt of an application program from the server node 12, outputs the received application program to the task execution part 152. The task execution part 152 stores and executes a program for a database search task inputted from the reception processing part 146 to acquire the result of the database search task for output to the result output part 156, whereupon the result output part 156 outputs the result of the database search task inputted from the task execution part 152 to a monitor device or an HDD.

The operation of the Internet 1 will now be described with reference to FIG. 4(A) and FIG. 5 taking as an example where the client node 14b-1 requests that the server node 12 process a database search and the server node 12 side processes the database search. When database search task is indicated by the user of the client node 14b-1, the user interface part 142 generates manipulation data for a database search task for output to the task request part 144. As shown as S220 in FIG. 4(B), the task request part 144 generates a task request signal requesting the server node 12 to process a database search and send it to the server node 12 through the send processing part 154 and the network 16b, 16a.

In the server node 12, the reception processing part 122 receives a task request signal from the client node 14b-1 and outputs it to the task control part 124. The task control part 124 acquires a CPU load ratio OR-1 in response to the inputted task request signal (FIG. 5, S100 ). The task control part 124 then proceeds to task in S106 when the acquired CPU load ratio OR-1 is higher than a preset value TH (FIG. 5, S102 ).

In step 106 (S106 ), the task control part 124 controls the task execution part 132 to have it process the database search task requested by the client node 14b-1. The task execution part 132 is supplied with a program for the database search task from the database 128 and executes the supplied program to output the result of the task to the send processing part 134. In step 108 (S108), the send processing part 134 sends the result of the task database search inputted from the task execution part 132 to the client node 14b-1 through the send processing part 134 and the network 16a, 16b.

In the client node 14b-1, the reception processing part 146, in receiving the result of the database search task from the server node 12, outputs the received result of the task to the result output part 156. The result output part 156 outputs the result of processing database search inputted from the reception processing part 146 to a monitor device or an HDD and the like.

Figure 6:
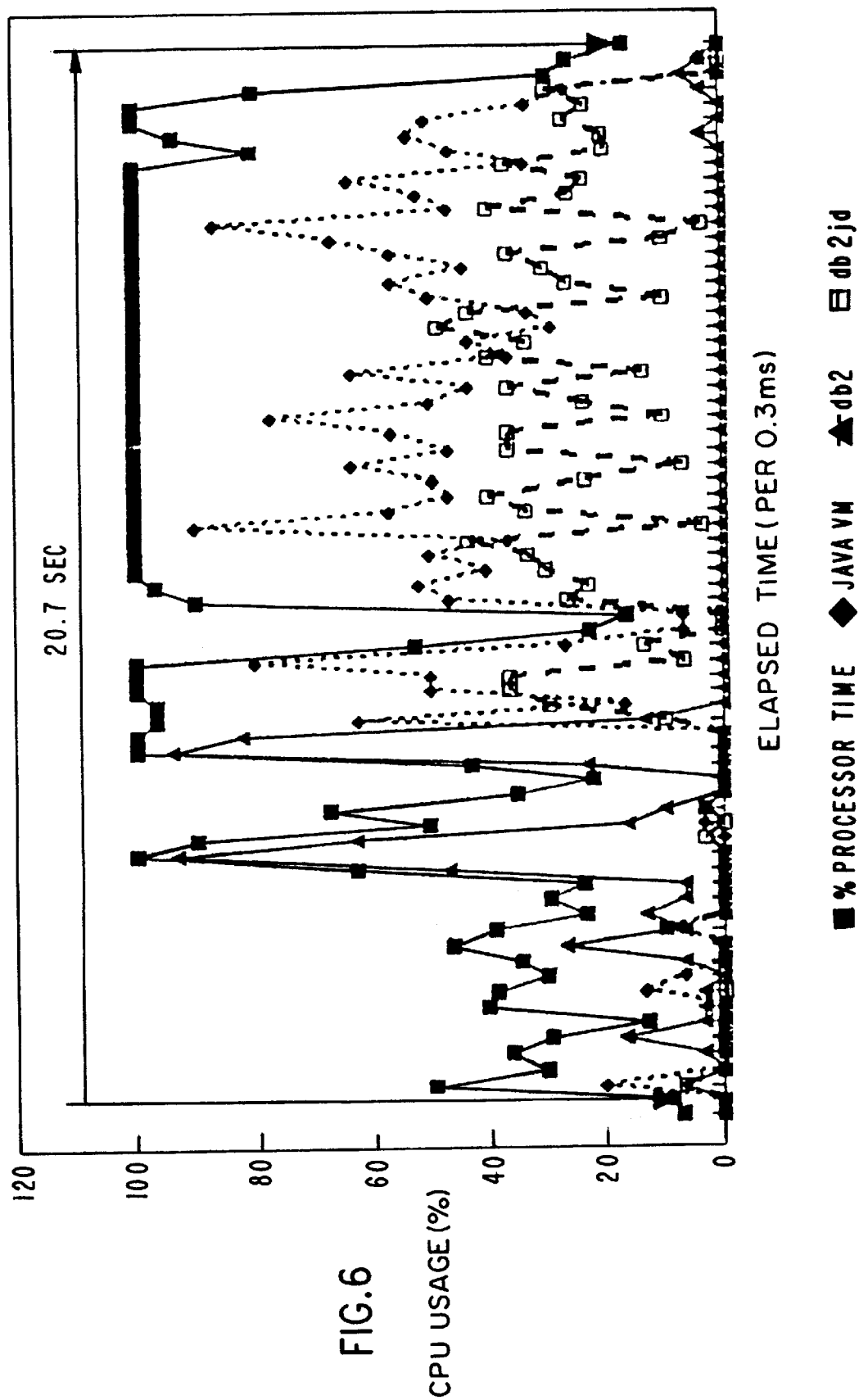
FIG. 6 is a diagram showing an example of the CPU load ratio and the response time of the server node calculated by a simulation under a condition that one client node requests one server node to process a database search.

The effect of distributing processing load, which is implemented between the server node 12 and the client node 14 by applying the above described distributed processing method to Internet 1, will now be described hereunder with reference to FIG. 6 through FIG. 10. FIG. 6 is a diagram showing an example of a CPU load ratio and response time of the server node 12 calculated by simulation with a condition that one client node 14 requests one server node 12 to process a database search.

Figure 7:
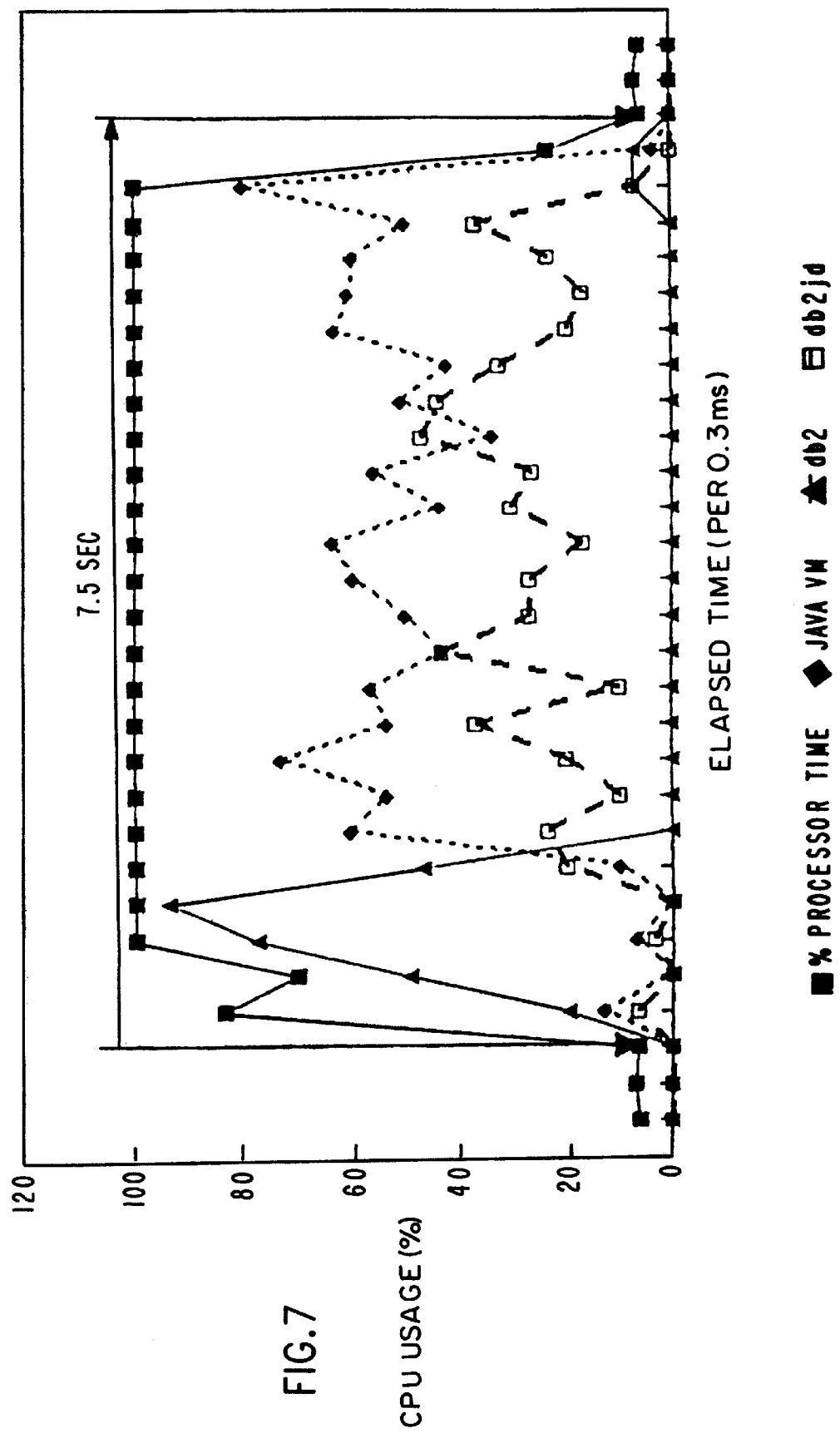
FIG. 7 is a diagram showing an example of the CPU load ratio and the response time of the server node calculated by a simulation under a condition that two client node requests one server node to process a database search.

FIG. 7 is a diagram showing an example of a CPU load ratio and response time of the server node 12 calculated by simulation of a condition in which two client nodes 14 request one server node 12 to process a database search.

Figure 8:
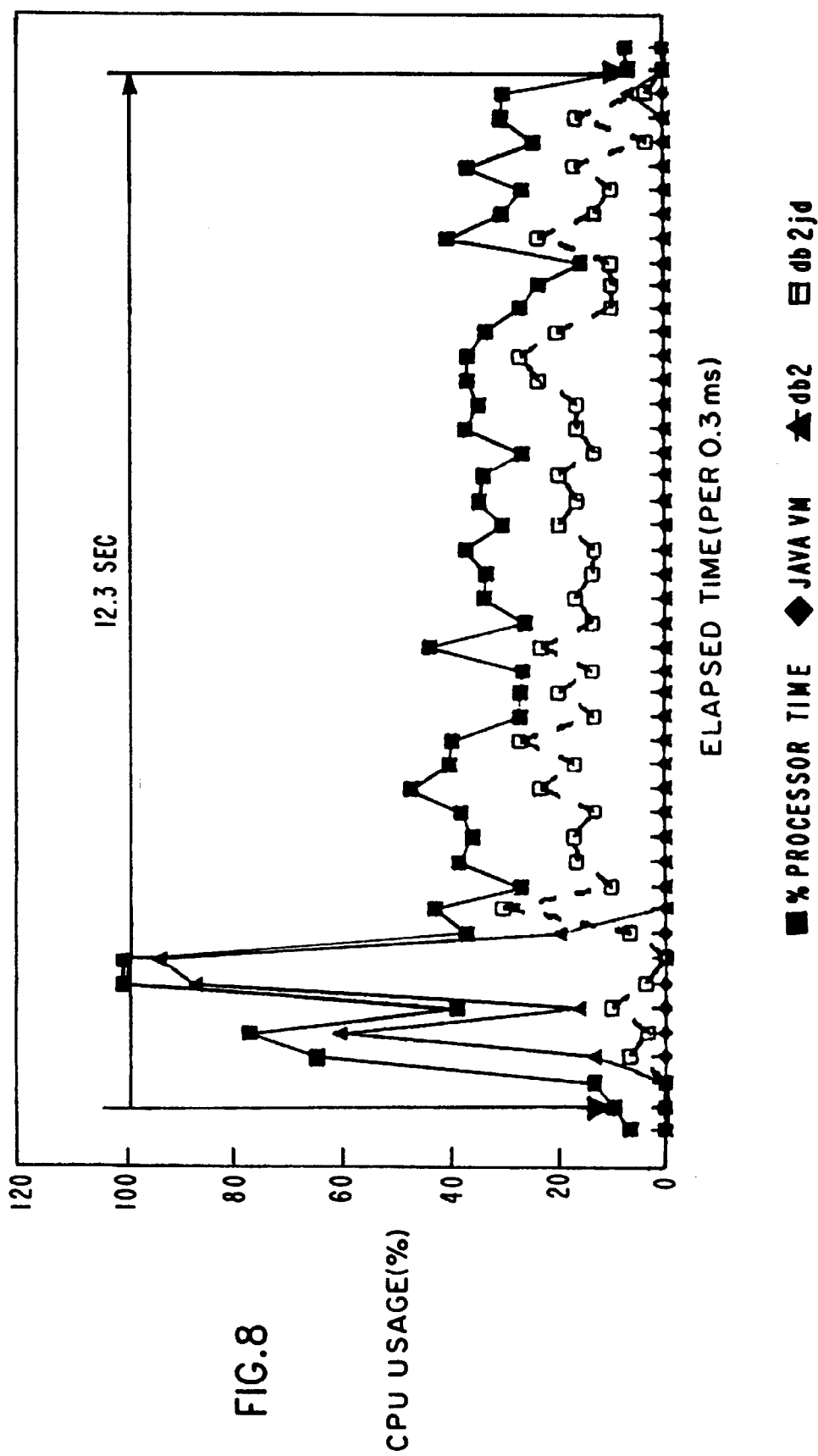
FIG. 8 is a diagram showing an example of the CPU load ratio and the response time of the server node calculated by a simulation under a condition that one client node executes an application program for a database search task while the server node processes the database search.

FIG. 8 is a diagram showing an example of a CPU load ratio and response time of the server node 12 calculated by simulation of a condition that one client node 14 executes an application program for a database search task and searches the database of server node 12.

Figure 9:
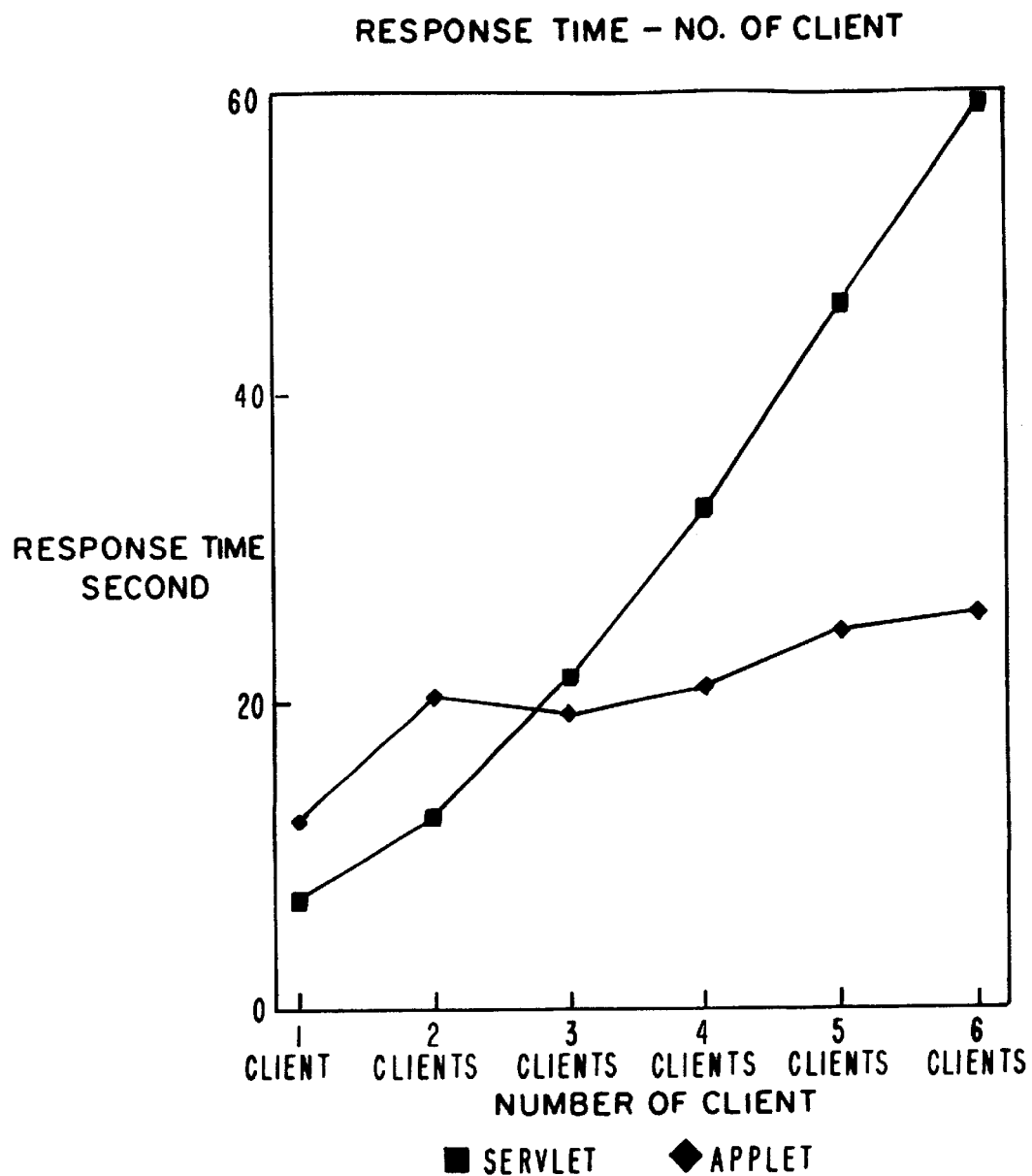
FIG. 9 is a diagram showing an example of the response time of the database search task calculated by a simulation under a condition that the number of the client nodes is changed in the internet shown in FIG. 1 and the client node side executes an application program to process the database search.

FIG. 9 is a diagram showing an example of the response time for a database search task calculated by a simulation under such condition that the number of client nodes 14 is changed in the Internet 1 shown in FIG. 1 and the database search is processed only in the server node 12 (i.e., the Servlet plot), and under such condition that the client node 14 side executes an application program for a database search task (i.e., the Applet plot).

Figure 10:
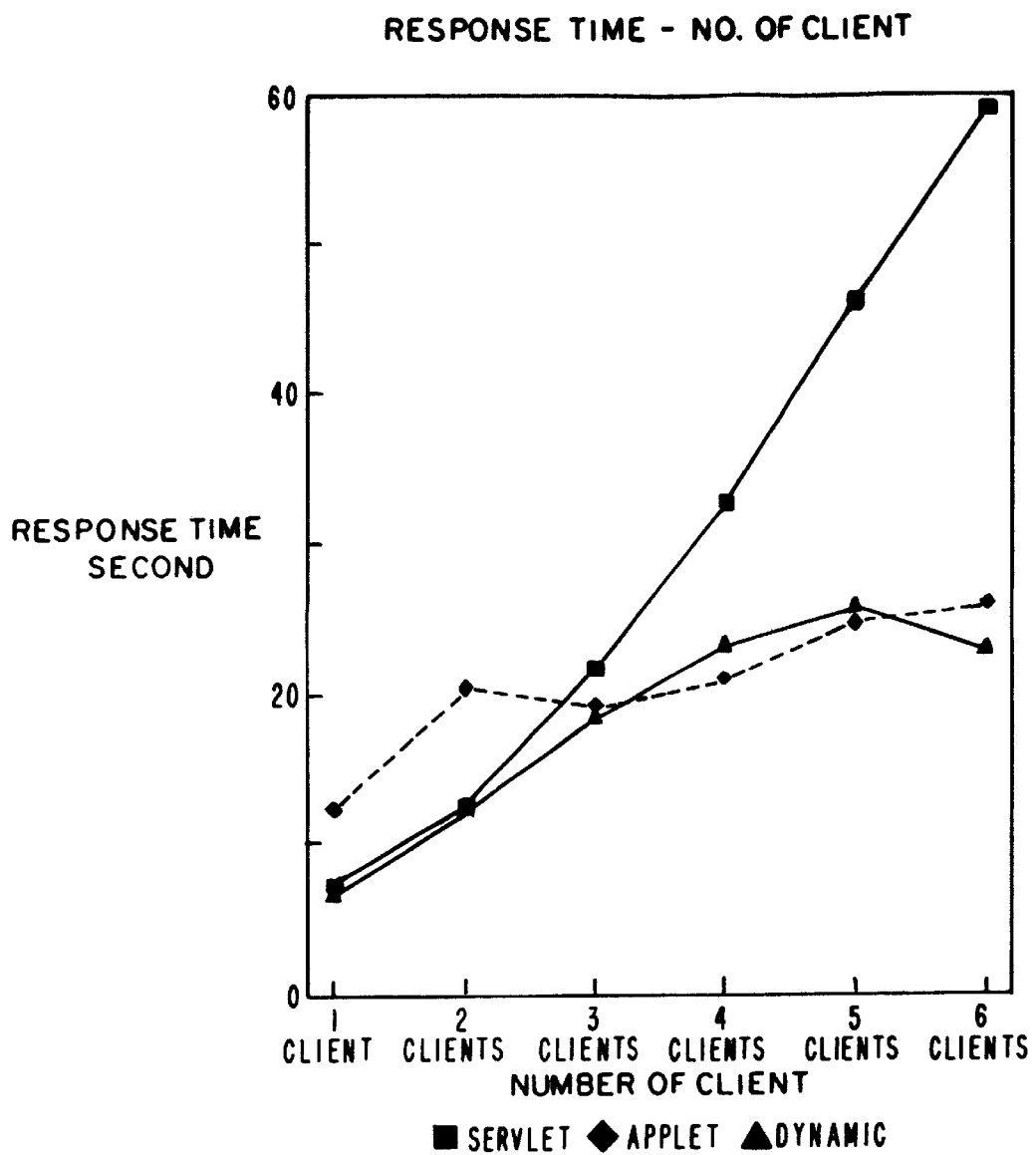
FIG. 10 is a diagram showing an example of the response time of the database search task calculated by a simulation under a condition that the number of the client nodes is changed in the internet shown in FIG. 1 and the load is distributed according to the distributed processing method described in the above.

FIG. 10 is a diagram showing an example of a response time of database search task calculated by a simulation under a condition that the number of client nodes 14 is changed in the Internet 1 shown in FIG. 1 and the load is distributed according to the distributed processing method described in the above as an embodiment.

The conditions of the simulation shown in FIG. 6 through FIG. 8 are as shown in the table 1 below. While the simulation shown in FIG. 6 through FIG. 8 is done in a different time frame from the simulation shown in FIG. 9 and FIG. 10 resulting in inconsistency due to the difference of processing loads of the computer then used for the simulation, there is no essential inconvenience in determining the trend of the change of processing time and the like.

TABLE 1 conditions to calculate values shown in
FIG. 6 through FIG. 10

1. Conditions of the client:

| | |
|---|---|
| CPU | ; 180486 (Intel)/66 MHz |
| Memory capacity | ; 32 MB |
| Operating program | ; Web Browser (Netscape)/100 MHz |

2. Conditions of the Server

| | |
|---|---|
| CPU | ; 180486 (Intel)/66 MHz |
| Memory capacity | ; 48 MB |
| Operating program | ; DB2 Server (IBM) |
| | Web Server (Microsoft) |
| | JDBC Demon (IBM) |
| 3. Content of the Task | ; Select sentence to make 1000 records hit from 50000 records | provided that a CPU of relatively low processing capability and a small memory capacity is intentionally used in the calculating conditions to clarify the CPU load ratio and the response time.

As shown in FIG. 6, when the server node 12 processes the database search in response to a database search task request from one client node 14, the response time is as short as 7.5 seconds while the load ratio of the CPU is substantially 100%, so that it is found that the processing load of the CPU of the server node 12 becomes very heavy.

Further, as shown in FIG. 7, when the server node 12 processes the database search in response to a database search task request from two client nodes 14, the response time is as long as 20.7 seconds with the increased load ratio of the CPU. This is because a swap has occurred due to the small memory capacity of the server.

Further, as shown in FIG. 8, when the client node 14 executes an application program to process the database search, the load ratio of the CPU of the server node 12 is kept low because the Servlet on the server 12 is not used, but the response time becomes as long as 12.5 seconds.

Further, when the response time is calculated for a case where the number of the clients is changed and the server node 12 side processes the database search, and another case where the application program is executed in all client nodes 14 to process the database search of the server node 12, it is found that processing is faster when the server node 12 processes until the number of the client nodes is 2, while processing is faster when the client node 14 executes the application program for task if the number of the client nodes exceeds 2.

By applying the distributed processing method to Internet 1 to distribute the load between the server node 12 and the client node 14, the response time for the case of less than 3 client nodes—where the server node 12 processes the database search without the client node executing the application program—is equal to the response time for the case of more than 2 client nodes—where the client node 14 executes the application program to process the database search—as shown in FIG. 10. It is thus found that the processing load is distributed in optimum between the server node 12 and the client node 14 with effective utilization of resources within Internet 1.

In other words, when the number of the client nodes 14 requesting the server node 12 to process is small, the user can obtain the result of the task in a very short response time, when compared to the case where the client node 14 executes the application program, by using a CPU of higher speed than the client node 14 and effectively utilizing the resources of the server node 12 which has a larger memory capacity.

Conversely, when the number of the client nodes 14 requesting the server node 12 to process is large, the user does not have to wait for an unreasonably long response time to obtain the result of the task because the resources in each server node 12 is effectively utilized and there is no excessive concentration of processing load to the client node 14.

Further, because the load distributing method cited as prior art determines a node which executes a process (task) based on information registered in advance, change of the node executing the process requires re-writing information which is set in the node, so that a dynamic distribution of the task is not conveniently done; while, in the distributed processing method of this invention, a node which is optimum for executing the process can be dynamically determined and selected depending on the processing load of the server node each time a task is requested. Accordingly, distribution of the processing load of the entire system can be always optimized without setting in advance information indicating which node is to process according to the distributed processing method of this invention.

Figure 5:
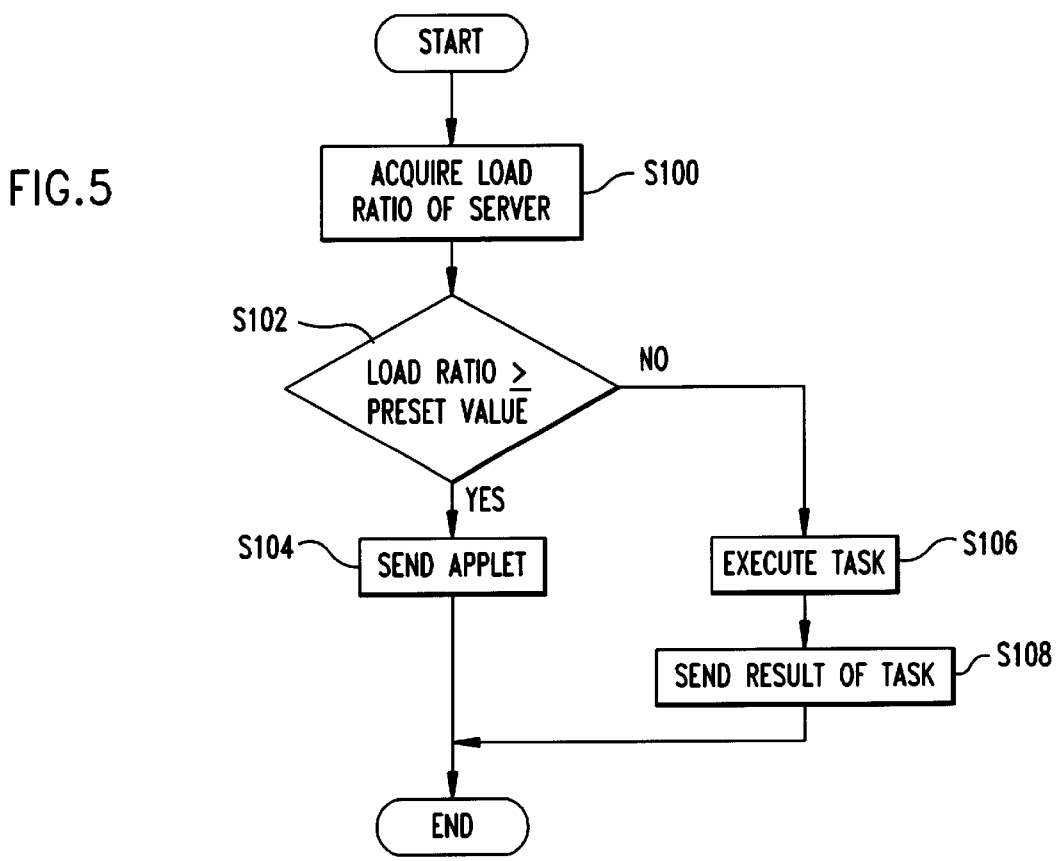
FIG. 5 is a flow chart showing the content of task in the client node.

Further, because the content of the task to implement the distributed processing method of this invention is simple as shown in FIG. 5, the scale of the software to be added to the server node and the client node of the Internet is small and the cost of development is also small. It is therefore easy to apply the distributed processing method of this invention to existing network without needing a large cost.

The distributed processing method of this invention is also applicable to every network regardless of the size thereof. The configuration of the Internet 1 shown in FIG. 1 is for exemplary purpose and the distributed processing method of this invention may be widely applicable to an intranet, a parallel processing computer system and other systems beside the Internet.

While the load ratio of the CPU was used as a value to determine the processing load of the server node as an example in the above described embodiment, other values such as the number of processes which the server node is processing and the number of threads existing in the process ( e.g., the number of threads of JDBC listener) may be used as well.

In short, resource information which the server node can provide in response to a service call may be used as a value to determine the processing load in the distributed processing method of this invention. As to what value is specifically used to determine the processing load, an optimum value may be used depending on the content of the task of the application program and in what situation the task will be done by the client node.

The configuration of the server node 12 and the client node 14 shown in FIG. 2 and FIG. 3 are for exemplary purposes and the components may be implemented by either software or hardware so long as the same functions and performance are realized. Task, software and hardware shown in this embodiment are for exemplary purpose and the distributed processing method of this invention may be widely applicable to a system which performs distributed processing between a client device and a server device.

According to the distributed processing system, the client node, the server node and the distributed processing method of this invention, the response time from the time when the client node issues a processing request until the result of the task is obtained is minimized as a whole system by suitably distributing the load between the client node and the server node in a client-server system in which a client node and a server node communicate with each other through a network.

Further according to the distributed processing system, the client node, the server node and the distributed processing method of this invention, are adapted to the existing client-server system without requiring an extensive system modification and a large amount of investment; yet still provide a large reduction of response time.

The invention has been described with reference to several specific embodiments. One having skill in the relevant art will recognize that modifications may be made without departing from the spirit and scope of the invention as set forth in the appended claims.

Having thus described our invention, what we claim as new and desire to secure by Letters Patent is:

1. A distributed processing system comprising at least one client node and at least one server node,
   wherein each of said at least one client node comprises:
     task request means for generating a task request to said at least one server node to process a predetermined task;
     task program executing means for receiving a program for executing said requested predetermined task from said server node and executing said task in accordance with the content of a response signal returned from said at least one server node in response to said task request; and
     task result acquiring means for receiving one of the result of client node execution of said program received from said server node and the result of said predetermined task as executed by said server node;
   and wherein each of said at least one server node comprises:
     processing load measuring means for measuring the processing load of the server node;
     response means responsive to the measured processing load of the server node for returning to each requesting one of said at least one client node at least one response signal pertaining to said predetermined task;
     program sending means for sending the program for client execution of said predetermined task to each requesting one of said at least one client node when each requesting client node is to execute said predetermined task; and
     task executing means for executing said predetermined task and sending the result of execution to each requesting one of said at least one client node.

2. The distributed processing system of claim 1 further comprising comparator component for comparing said measured processing load to a preset value whereby when the measured processing load of the server node is at least said preset value, said response means returns said response signal for executing said predetermined task to each requesting client node and said program sending means sends said program for the predetermined task to each requesting client node.

3. The distributed processing system of claim 1 further comprising comparator component for comparing said measured processing load to a preset value whereby when the measured processing load of the server node is less than a preset value, said task executing means executes said predetermined task requested and sends the result of execution to each requesting client node.

4. In a distributed processing system including at least one client node and at least one server node for communicating with said at least one client node, each of said at least one client node comprising:
     task request means for generating a task request to said at least one server node to process a predetermined task;
     task program executing means for receiving a program for client execution of said requested predetermined task from said server node and executing said task in accordance with the content of a response signal returned from said at least one server node in response to said task request; and
     task result acquiring means for receiving one of the result of client execution of said program received from said server node and the result of said predetermined task executed by said server node.

5. In a distributed processing system including at least one server node and at least one requesting client node for communicating at least one task request for a predetermined task to said at least one server node, each of said at least one server node comprising:
     processing load measuring means for measuring the processing load of the server node;
     response means responsive to the measured processing load of the server node for returning to each requesting one of said at least one client node at least one response signal pertaining to said predetermined task;
     program sending means for sending the program for client execution of said predetermined task to each requesting one of said at least one client node when each requesting client node is to execute said predetermined task; and
     task executing means for executing said predetermined task and sending the result of server execution to each requesting one of said at least one client node.

6. The server node of claim 5 further comprising comparator means for comparing said measured processing load to a preset value.

7. In a distributed processing system comprising at least one client node and at least one server node, a dynamic distributed processing method comprising:
   the steps performed by each of said client nodes of;
     generating a task request to at least one server node to do a predetermined task;
     receiving a response signal from said server in response to said task request;
     receiving a program for client execution of said requested predetermined task from said server node when said task is to be executed at said client node in accordance with the content of said response signal; and
     receiving one of the result of client execution of said program received from said server node and the result of said predetermined task executed by said server node; and
   steps performed by said at least one server node of:
     measuring the processing load of said at least one server node; and
     generating at least one response signal to each requesting one of said at least one client node based on said measuring.

8. The method of claim 7 further comprising comparing said processing load to a preset value.

9. The method of claim 8 wherein said comparing determines that said processing load is at least the same as said preset value and wherein generating at least one response signal comprises sending the program for said predetermined task to each said requesting client node for said requesting client node to execute said predetermined task.

10. The method of claim 8 wherein said comparing determines that said processing load is less than said preset value and further comprising said at least one server node executing said predetermined task and sending the result of execution to each requesting client node.

11. In a distributed processing system comprising at least one client node and at least one server node, a dynamic distributed processing method comprising at each client node the steps of:

generating a task request to at least one server node to do a predetermined task;

receiving a response signal from said server in response to said task request;

receiving a program for executing said requested predetermined task from said server node when said task is to be for executed at said client node in accordance with the content of said response signal; and providing one of the result of execution at said client node of said program received from said server node and the result of said predetermined task as executed by said server node.

12. In a distributed processing system comprising at least one client node for communicating a task request for a predetermined task to at least one server node, a dynamic distributed processing method comprising at said at least one server node, the steps of:

measuring the processing load of said at least one server node; and generating at least one response signal to each requesting one of said at least one client node based on said measuring, said at least one response signal comprising one of a response signal comprising the results of server execution of said task and a response signal comprising software for client node execution of said task.

13. The method of claim 12 further comprising comparing said processing load to a preset value.

14. The method of claim 13 wherein said comparing determines that said processing load is at least the same as said preset value and wherein generating at least one response signal comprises sending the program for said predetermined task to each said requesting client node for said requesting client node to execute said predetermined task.

15. The method of claim 13 wherein said comparing determines that said processing load is less than said preset value and further comprising said at least one server node executing said predetermined task and sending the result of execution to each requesting client node.

16. In a distributed processing system consisting of at least one client node and at least one server node, a computer readable recording medium recording a computer program for executing the steps of:

generating a task request to at least one server node to do a predetermined task;

receiving a response signal from said server in response to said task request;

receiving a program for client execution of said requested predetermined task from said server node when said task is to be for executed at said client node in accordance with the content of said response signal; and providing one of the result of execution at said client node of said program received from said server node and the result of said predetermined task as executed by said server node.

17. In a distributed processing system consisting of at least one client node and at least one server node for receiving at least one task request for processing a predetermined task from at least one requesting client node, a computer readable medium recording a computer program for executing the steps of:

measuring the processing load of said at least one server node; and generating at least one response signal to each requesting one of said at least one client node based on said measuring, said at least one response signal comprising one of a response signal comprising the results of server execution of said task and a response signal comprising software for client node execution of said task.

18. The method of claim 17 further comprising comparing said processing load to a preset value.

19. The method of claim 18 wherein said comparing determines that said processing load is at least the same as said preset value and wherein generating at least one response signal comprises sending the program for said predetermined task to each said requesting client node for said requesting client node to execute said predetermined task.

20. The method of claim 18 wherein said comparing determines that said processing load is less than said preset value and further comprising said at least one server node executing said predetermined task and sending the result of execution to each requesting client node.

* * * * *